United States Patent
Maeda et al.

(10) Patent No.: US 11,809,885 B2
(45) Date of Patent: Nov. 7, 2023

(54) AGENT DEVICE, AGENT SYSTEM, AND RECORDING MEDIUM

(71) Applicant: TOYOTA JIDOSHA KABUSHIKI KAISHA, Toyota (JP)

(72) Inventors: Eiichi Maeda, Itabashi-ku (JP); Chikage Kubo, Chofu (JP); Keiko Nakano, Kawasaki (JP); Hiroyuki Nishizawa, Itabashi-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 17/158,070

(22) Filed: Jan. 26, 2021

(65) Prior Publication Data

US 2021/0232414 A1    Jul. 29, 2021

(30) Foreign Application Priority Data

Jan. 29, 2020    (JP) ................. 2020-013026

(51) Int. Cl.
  *G10L 15/26* (2006.01)
  *G06F 40/35* (2020.01)
  *G06F 9/451* (2018.01)
  *B60K 37/02* (2006.01)

(52) U.S. Cl.
  CPC ............. *G06F 9/453* (2018.02); *B60K 37/02* (2013.01); *G06F 40/35* (2020.01); *G10L 15/26* (2013.01); *B60K 2370/148* (2019.05); *B60K 2370/1575* (2019.05); *B60K 2370/164* (2019.05)

(58) Field of Classification Search
  CPC ........... G06F 16/00; G06F 40/35; G10L 15/26
  See application file for complete search history.

(56) References Cited

U.S. PATENT DOCUMENTS

| 2005/0086270 A1* | 4/2005 | Shimizu | G06F 16/2358 |
| 2012/0173566 A1* | 7/2012 | D'Angelo | G06F 16/3329 |
| | | | 707/769 |

FOREIGN PATENT DOCUMENTS

| CN | 112988988 A | * | 6/2021 | |
| JP | 2001-141500 A | | 5/2001 | |
| JP | 2007-299159 A | | 11/2007 | |
| JP | 2021051172 A | * | 4/2021 | |
| JP | 6980411 B2 | * | 12/2021 | |
| WO | WO-2018146492 A1 | * | 8/2018 | ......... G06F 16/2272 |

* cited by examiner

*Primary Examiner* — Shreyans A Patel
(74) *Attorney, Agent, or Firm* — Oblon, McClelland, Maier & Neustadt, L.L.P.

(57) ABSTRACT

An agent device receives input information that is input by the user, in a case in which the input information is a question from the user, executes inference processing on the input information to infer an intent of the question in order to acquire a response to the question based on the intent, in a case in which a plurality of the responses are acquired, provides the notification device with option information that includes the plurality of responses as options, in a case in which new input information is received, determines whether the new input information is information requiring the inference processing or is selection information relating to a selection result from selection of the options, and in a case in which the new input information is the selection information, provides the notification device with response information regarding the response associated with the selection result without executing the inference processing.

11 Claims, 13 Drawing Sheets

FIG.6

| RESPONSE NUMBER | INTENT LABEL | TEXT FOR AUDIO | TEXT FOR DISPLAY | OM ITEM CODE |
|---|---|---|---|---|
| 1 | 289 | METHOD OF EXTINGUISHING HEADLIGHTS | TO TURN OFF HEADLIGHTS··· | OM 123-4 |
| 2 | 13 | METHOD OF EXTINGUISHING INTERIOR CABIN LIGHT | TO TURNOFF INTERIOR CABIN LIGHT··· | |
| ··· | ··· | ··· | | |

HOW TO TURN OFF INTERIOR CABIN LIGHT

TO TURN OFF INTERIOR CABIN LIGHT:

TOUCH INTERIOR CABIN LIGHT ON CEILING

MORE DETAILS

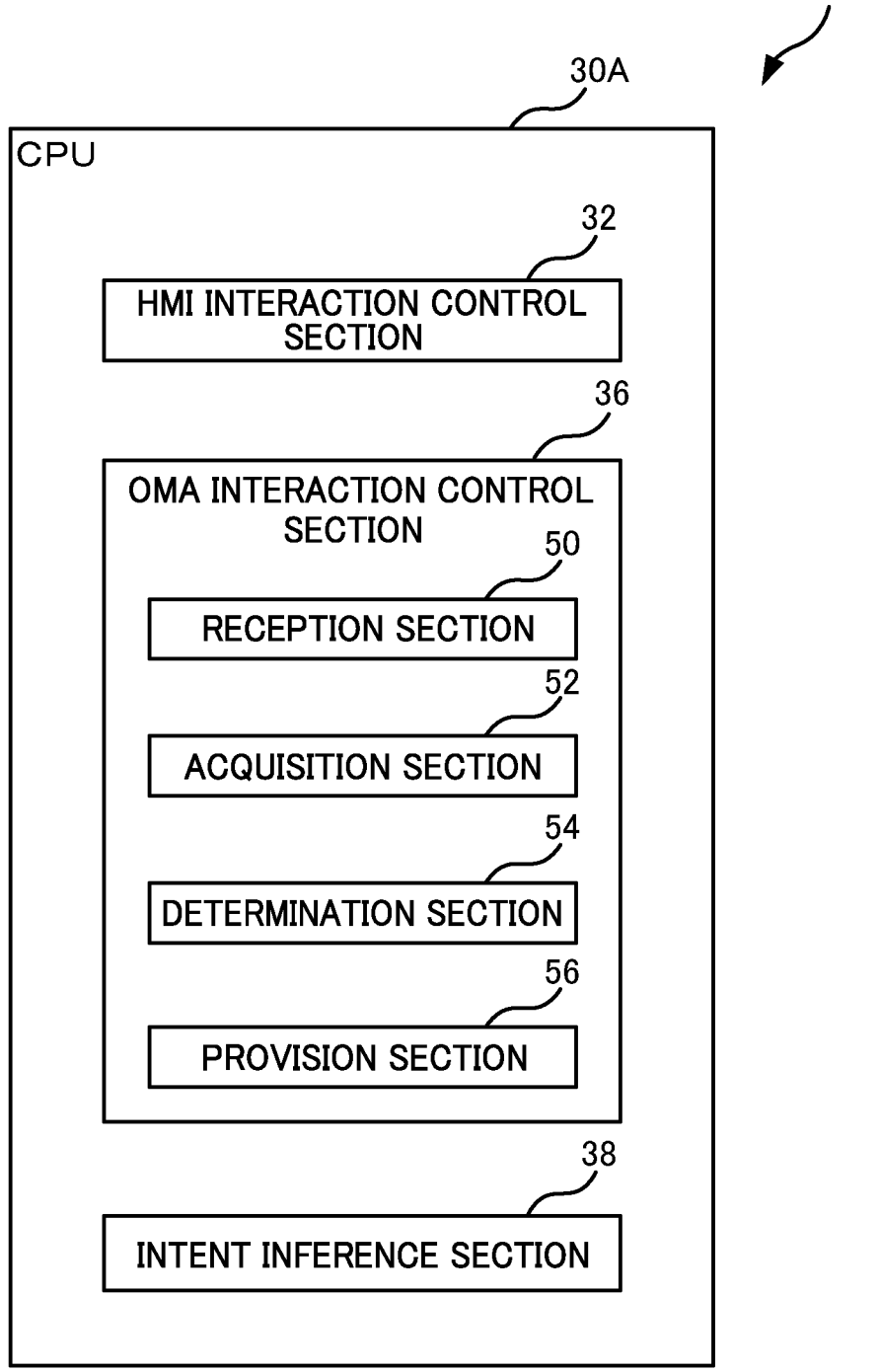

AGENT DEVICE, AGENT SYSTEM, AND RECORDING MEDIUM

CROSS-REFERENCE TO RELATED APPLICATION

This application is based on and claims priority under 35 USC 119 from Japanese Patent Application No. 2020-013026 filed on Jan. 29, 2020, the disclosure of which is incorporated by reference herein.

BACKGROUND

Technical Field

The present disclosure relates to an agent device, an agent system, and a recording medium recording a program therein used to provide a response to a user question.

Related Art

Japanese Patent Application Laid-Open (JP-A) No. 2001-141500 discloses a vehicle agent processing device that provides information relevant to operation of various onboard units.

In cases in which the vehicle agent processing device of JP-A No. 2001-141500 is applied to an agent used to search an owner's manual, cases may be envisaged in which the intent of a user's question relating to functionality or the like is inferred, and information in the owner's manual is then returned as a response to the question. When this is performed, sometimes plural responses to the user's question are presented as options. However, there is a possibility that if, for example, the user responds by saying "The second one", the agent that is configured to infer the intent of questions may be unable to infer the intent of the response "The second one".

SUMMARY

An aspect of the disclosure is an agent device that includes: a memory; and a processor coupled to the memory. The processor is configured to: receive, from a notification device for notifying information to a user, input information that is input by the user, in a case in which the input information is a question from the user, execute inference processing on the input information to infer an intent of the question in order to acquire a response to the question based on the intent, in a case in which a plurality of the responses are acquired, provide the notification device with option information that includes the plurality of responses as options, in a case in which new input information is received, determine whether the new input information is information requiring the inference processing or is selection information relating to a selection result from selection of the options, and in a case in which the new input information is the selection information, provide the notification device with response information regarding the response associated with the selection result without executing the inference processing.

BRIEF DESCRIPTION OF THE DRAWINGS

Exemplary embodiments of the present disclosure will be described in detail based on the following figures, wherein:

FIG. 6 is a diagram illustrating an example of contents of option information;

FIG. 13 is a block diagram illustrating an example of functional configuration of an agent server of a second exemplary embodiment.

DETAILED DESCRIPTION

First Exemplary Embodiment

Figure 1:
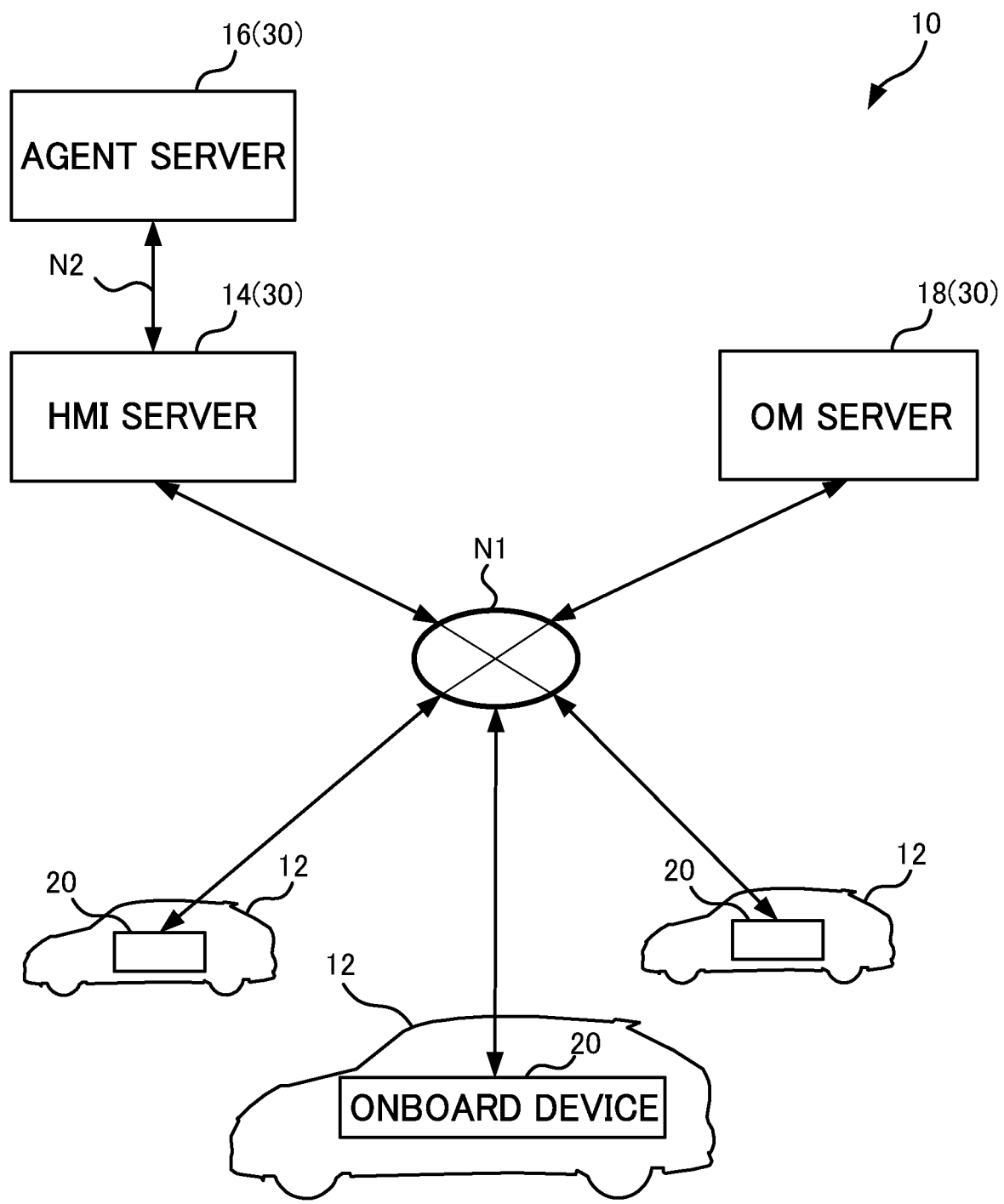
FIG. 1 is a diagram illustrating an example of schematic configuration of a manual provision system according to a first exemplary embodiment.

As illustrated in FIG. 1, a manual provision system 10 configuring an agent system of a first exemplary embodiment includes plural vehicles 12 and plural servers 30. An onboard device 20 serving as a notification device is installed in each of the vehicles 12. The servers 30 include a human machine interface (hereafter "HMI") server 14 serving as an interface device with an HMI function, an agent server 16 serving as an agent device, and an owner's manual (hereafter also abbreviated to OM) server 18.

The onboard devices 20 of the respective vehicles 12, the HMI server 14, and the OM server 18 are connected together through a network N1. The HMI server 14 and the agent server 16 are connected together through a network N2. Note that the agent server 16 may also be connected to the network N1, similarly to the other servers 30.

Vehicle

Figure 2:
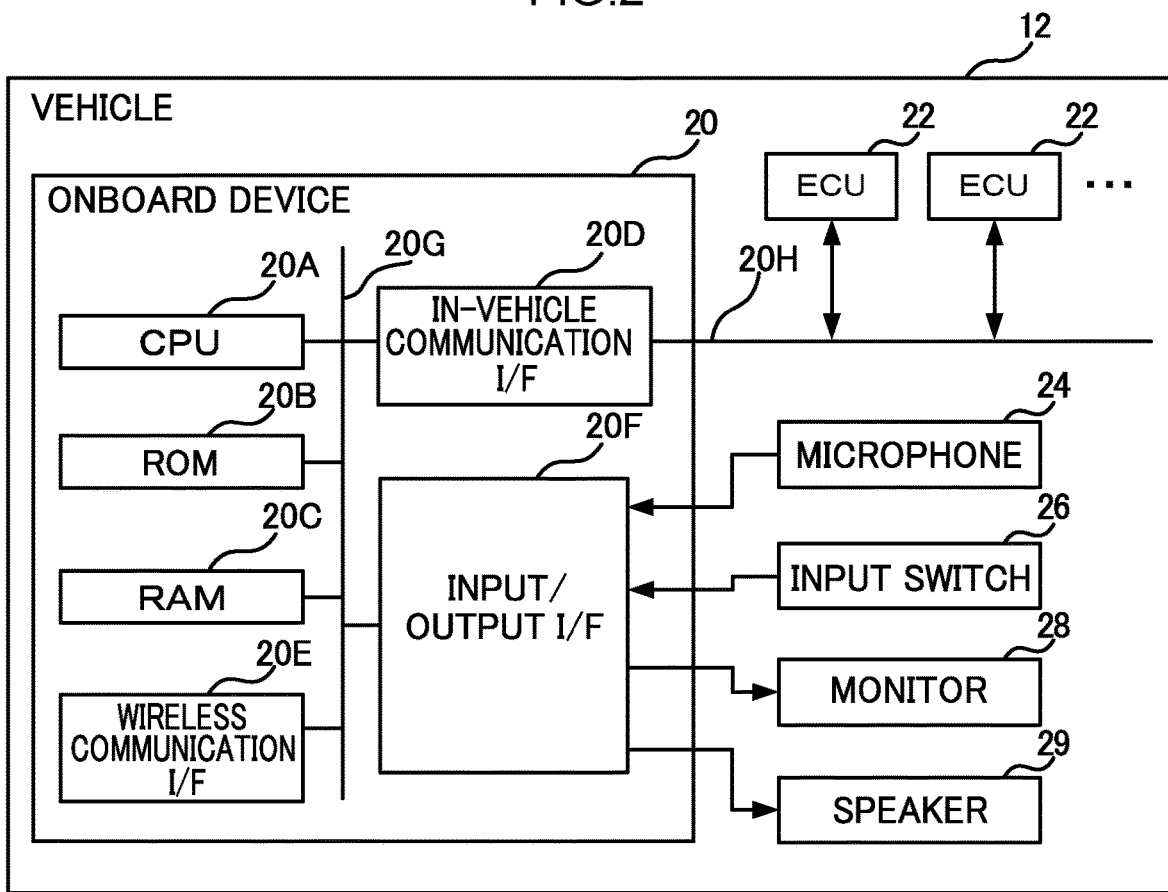
FIG. 2 is a block diagram illustrating an example of hardware configuration of a vehicle of the first exemplary embodiment.

As illustrated in FIG. 2, each of the vehicles 12 according to the present exemplary embodiment includes the onboard device 20, plural ECUs 22, a microphone 24 serving as an audio input device, an input switch 26 serving as an operation input device, a monitor 28 serving as a display device, and a speaker 29.

The onboard device 20 includes a central processing unit (CPU) 20A, read only memory (ROM) 20B, random access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are connected together through an internal bus 20G so as to be capable of communicating with each other.

The CPU 20A is a central processing unit that executes various programs and controls various sections. Namely, the CPU 20A reads a program from the ROM 20B, and executes the program using the RAM 20C as a workspace. The CPU 20A is an example of a processor.

The ROM 20B stores various programs and various data. The ROM 20B of the present exemplary embodiment is stored with a control program used to control the onboard device 20.

The RAM 20C serves as a workspace that temporarily stores programs and data. The RAM 20C is an example of memory.

The in-vehicle communication I/F 20D is an interface for connecting to the ECUs 22. This interface employs a CAN communication protocol. The in-vehicle communication I/F 20D is connected to an external bus 20H. Plural of the ECUs 22 are provided corresponding to respective functionality of the vehicle 12. Examples of the ECUs 22 of the present exemplary embodiment include a vehicle control ECU, an engine ECU, a brake ECU, a body ECU, a camera ECU, and a multimedia ECU.

The wireless communication I/F 20E is a wireless communication module used to communicate with the servers 30. The wireless communication module employs a communication protocol such as 5G LTE, or Wi-Fi (registered trademark). The wireless communication I/F 20E is connected to the network N1.

The input/output I/F 20F is an interface used to communicate with the microphone 24, the input switch 26, the monitor 28, and the speaker 29 installed in the vehicle 12.

The microphone 24 is provided in a front pillar, dashboard, or the like of the vehicle 12, and is a device that picks up sound emanating from a user, namely an occupant of the vehicle 12.

The input switch 26 is provided to an instrument panel, a center console, a steering wheel, or the like, and is a switch configured for input operation by a finger of the occupant. For example, a push button ten-key pad or a touch pad may be employed as the input switch 26.

The monitor 28 is provided to the instrument panel, a meter panel, or the like, and is a liquid crystal monitor used to display images relating to an owner's manual as well as response information and option information, described later. The monitor 28 may be provided in the form of a touch panel that doubles as the input switch 26.

The speaker 29 is provided in the instrument panel, center console, front pillar, dashboard, or the like and is a device used to output audio relating to response information and option information.

Servers

Figure 3:
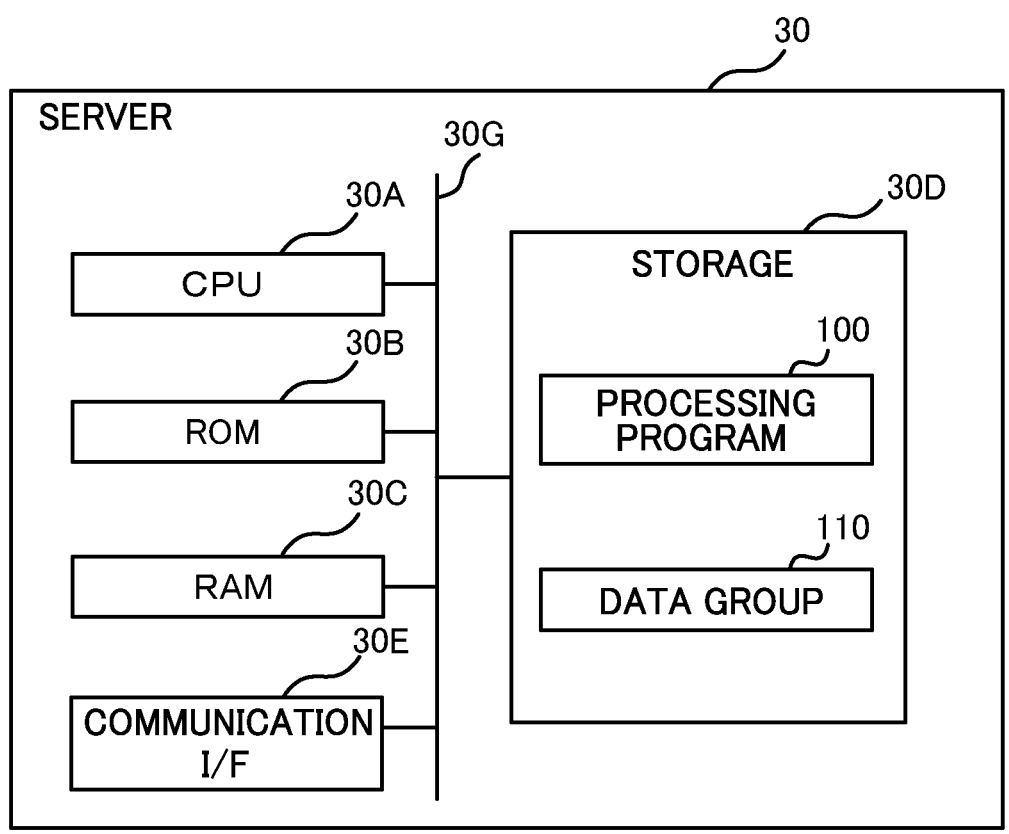
FIG. 3 is a block diagram illustrating an example of hardware configuration of a server of the first exemplary embodiment.

As illustrated in FIG. 3, each of the servers 30 includes a CPU 30A, this being an example of a hardware processor, ROM 30B corresponding to memory, RAM 30C, storage 30D, and a communication I/F 30E. The CPU 30A, the ROM 30B, the RAM 30C, the storage 30D, and the communication I/F 30E are connected together through an internal bus 30G so as to be capable of communicating with each other. The CPU 30A, the ROM 30B, the RAM 30C, and the communication I/F 30E have functionality equivalent to that of the CPU 20A, the ROM 20B, the RAM 20C, and the wireless communication I/F 20E of the onboard device 20 described above.

The storage 30D includes a hard disk drive (HDD) or a solid state drive (SSD), and is stored with various programs and various data.

The CPU 30A functions as an OMA interaction control section 36, namely a reception section 50, an acquisition section 52, a determination section 54, a provision section 56, and as an intent inference section 38, by loading a program from the storage 30D and executing this program using the RAM 30C as a workspace.

A processing program 100 and a data group 110 are stored in the storage 30D of the present exemplary embodiment. The processing program 100 is a program for implementing the various functionality included in the server 30.

HMI Server

The HMI server 14 includes functionality to receive questions from the onboard device 20, and to refer to the agent server 16 for a response to a question relating to an owner's manual.

Figure 5:
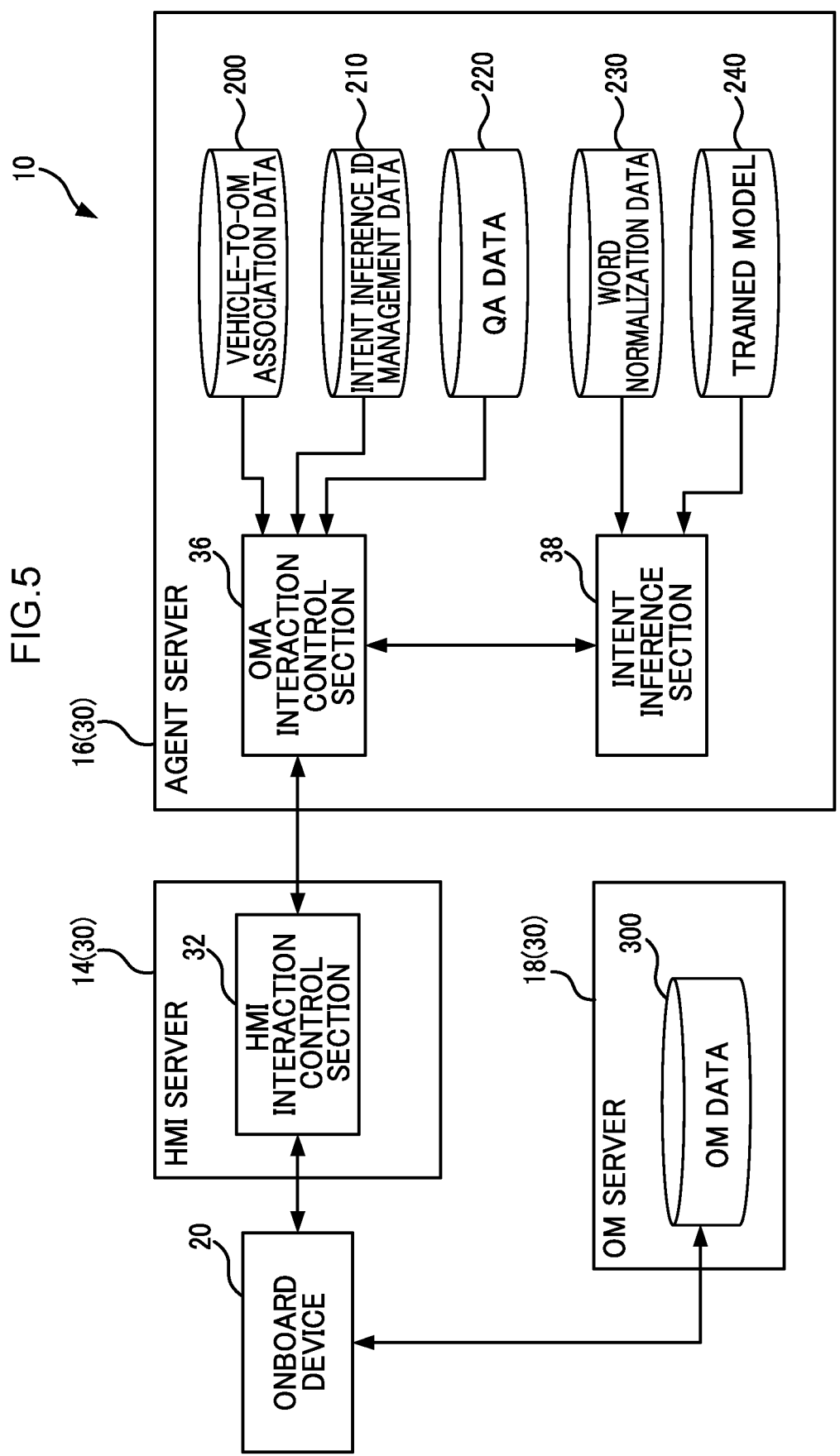
FIG. 5 is a block diagram to explain functionality of a manual provision system of the first exemplary embodiment.

As illustrated in FIG. 5, the CPU 30A of the HMI server 14 of the present exemplary embodiment executes the processing program 100 so as to function as an HMI interaction control section 32, serving as a selection section.

The HMI interaction control section 32 communicates with the onboard device 20. The HMI interaction control section 32 acquires audio information from the occupant of the vehicle 12 transmitted from the onboard device 20, performs speech recognition, and converts the audio information to text information. Note that in the present exemplary embodiment, it is anticipated that questions are asked in the form of utterances by the occupant of the vehicle 12. Accordingly, audio information relating to an occupant utterance serves as input information input to the onboard device 20 by the occupant. Input information is configured by audio information relating to a question uttered by the occupant, for example "How do I turn off this lamp?" or "What is the switch with an A in a circle?".

The HMI interaction control section 32 also interprets the intent of the occupant utterance based on the converted text information. In cases in which the HMI interaction control section 32 interprets that the occupant has asked a question relating to the owner's manual, the HMI interaction control section 32 refers to the agent server 16 regarding this question. The HMI interaction control section 32 also transmits text information relating to this question to the agent server 16, and receives response information or option information relating to the response from the agent server 16.

The HMI interaction control section 32 also transmits the response information or the option information received from the agent server 16 to the onboard device 20. Note that the response information or the option information includes both text information and audio information relating to a response to the question. The text information includes a URL used to view HTML data from the owner's manual.

In cases in which options are presented to the onboard device 20, the HMI server 14 also includes functionality to receive a selection result from out of the options from the onboard device 20, and to acquire a single selected response from the agent server 16 based on the selection result. In such cases, the HMI interaction control section 32 performs the following processing.

In cases in which option information has been received from the agent server 16, the HMI interaction control section 32 first stores the vehicle information, described later, and the option information in the storage 30D. The vehicle information is an example of specific information. Next, the HMI interaction control section 32 acquires audio information from the occupant of the corresponding vehicle 12 as transmitted from the onboard device 20, and performs speech recognition. The HMI interaction control section 32 interprets the intent of the occupant, and thereby determines whether or not the occupant has made a selection from out of the options.

When the occupant has made a selection from out of the options, the HMI interaction control section 32 identifies a response associated with the selection result based on the vehicle information and the audio information received from the onboard device 20, and based on the vehicle information and the option information stored in the storage 30D. The HMI interaction control section 32 then transmits an OM item code and an intent label, described later, serving as selection information, to the agent server 16. The combination of the OM item code and the intent label are an example of identification information used to identify the identified response.

Agent Server

The agent server 16 functions as an agent (an owner's manual agent (hereafter referred to as OMA)) that processes questions relating to owner's manuals. The agent server 16 acquires text information relating to the question and vehicle information for the corresponding vehicle 12 from the HMI server 14, and provides the HMI server 14 with response information relating to a response to the question or with option information relating to plural responses.

Figure 4:
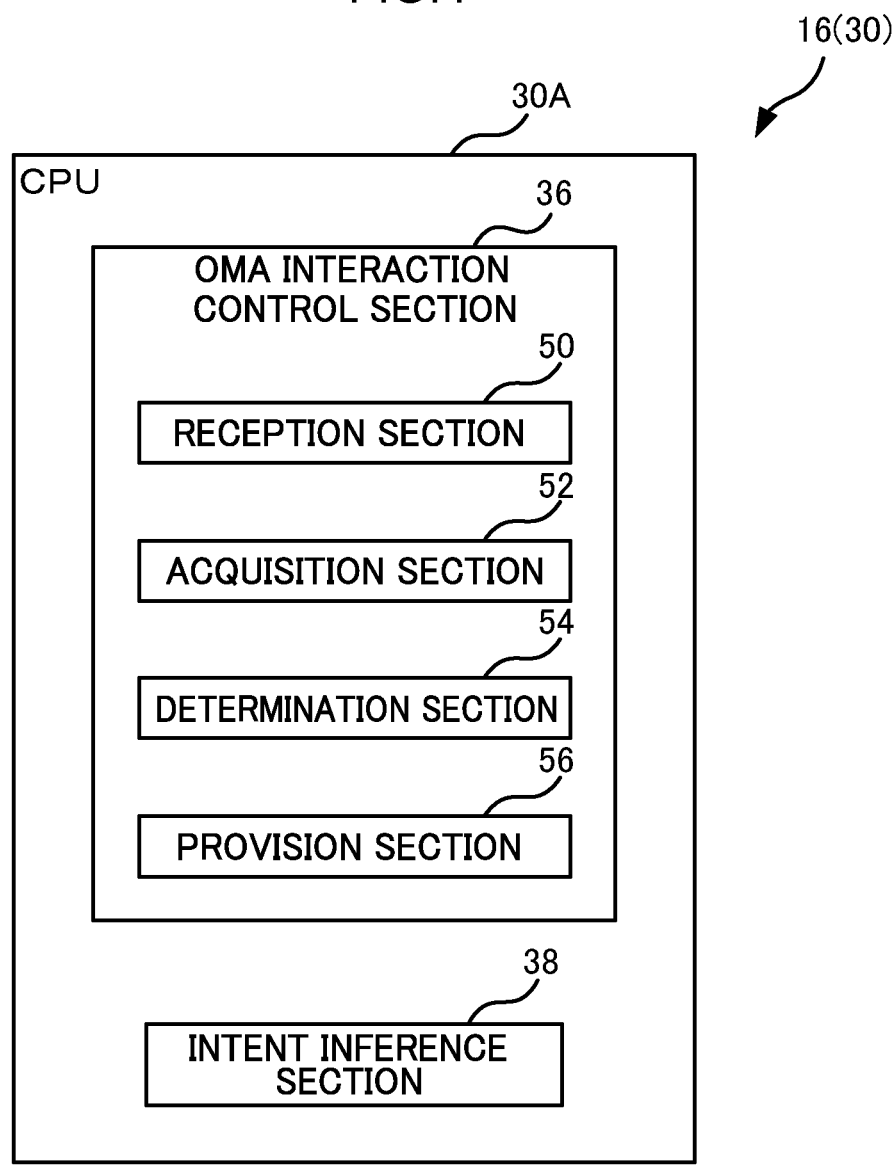
FIG. 4 is a block diagram illustrating an example of functional configuration of an agent server of the first exemplary embodiment.

In the agent server 16 of the present exemplary embodiment, the CPU 30A executes the processing program 100 so as to function as the OMA interaction control section 36 and the intent inference section 38 illustrated in FIG. 4. The OMA interaction control section 36 includes the reception section 50, the acquisition section 52, the determination section 54, and the provision section 56.

The data group 110 of the agent server 16 includes vehicle-to-OM association data 200, intent inference ID management data 210, QA data 220, word normalization data 230, and trained models 240, as illustrated in FIG. 5.

The vehicle-to-OM association data 200 is data in which vehicle information relating to the vehicle identification number, vehicle type, grade, equipment and so on of each of the vehicles 12 is stored in association with OM item codes allocated to respective owner's manuals.

The intent inference ID management data 210 is data in which association relationships between the OM item codes and intent inference engines are stored. In the intent inference ID management data 210, intent inference engine IDs are stored in association with the respective OM item codes. The intent inference engine IDs are IDs allocated to respective intent inference engines used during the execution of intent inference processing, described later. Individual intent inference engines are provided for similar or related owner's manuals.

The QA data 220 is data in which response information is held linked to intent labels allocated to each response. Note that the intent labels are label numbers provided as a result of inferring intent from content uttered by an occupant. The response information relates to responses to questions, and includes text for display, images for display, text for text-to-speech readout, information regarding URLs to display owner's manuals, and so on.

The word normalization data 230 is data employed to normalize words, and is used in a pre-processing stage before intent inference processing. This pre-processing refers to processing to standardize differences in notation and phrasing. For example, the word normalization data 230 may include data for standardizing differences in notation, such as information indicating that "off" and "OFF" correspond to the same word. As another example, the word normalization data 230 may include data for standardizing differences in phrasing, such as information indicating that "tire pressure warning lamp" and "air pressure warning lamp" refer to the same thing.

The trained model 240 is data generated by performing machine learning using training data, with an input of text information relating to plural expressions relevant to a given question, and an output of an intent label relating to a response to the question. The training data of the present exemplary embodiment defines correct responses to the plural expressions. One of the trained models 240 is trained in advance for each intent inference engine.

In the OMA interaction control section 36, firstly the reception section 50 receives vehicle information and text information. Next, in cases in which the text information corresponds to a question from the occupant, the acquisition section 52 of the OMA interaction control section 36 acquires a response to the question based on the vehicle information and the text information. The acquired response is obtained by performing intent inference processing to infer the intent of the question.

More specifically, the acquisition section 52 consults the vehicle-to-OM association data 200 to acquire the OM item code associated with a given vehicle 12 based on the vehicle information for this vehicle 12. In cases in which the acquisition section 52 is unable to acquire an OM item code, the acquisition section 52 notifies the HMI interaction control section 32 that "this service is unavailable". The acquisition section 52 also consults the intent inference ID management data 210 to acquire the OMA intent inference engine ID applicable to the given vehicle 12 based on the acquired OM item code.

The acquisition section 52 then refers to the intent inference section 38 using input values of the text information relating to the question and the OMA intent inference engine ID, and acquires an intent label corresponding to a response. In cases in which no intent label could be acquired, the provision section 56 transmits no-results information indicating that no results were found to the HMI server 14. On the other hand, in cases in which a single intent label has been acquired, the acquisition section 52 consults the QA data 220 to acquire the associated response information based on the acquired intent label and the OM item code.

In cases in which plural intent labels are acquired, the acquisition section 52 consults the QA data 220 to generate option information relating to plural response options. For example, as illustrated in FIG. 6, the option information is configured of a combination of the intent label, text for audio, text for display, and an OM item code for consultation for each of respective response numbers. The text for audio is audio data for output through the speaker 29 provided in the vehicle 12, and the text for display is text data for display on the monitor 28 provided in the vehicle 12.

In cases in which the reception section 50 has received new text information, the determination section 54 of the OMA interaction control section 36 illustrated in FIG. 5 determines whether this new text information is information requiring intent inference processing, or is selection information relating to a selection result from out of the options.

The provision section 56 of the OMA interaction control section 36 transmits one out of no-results information, response information, or option information to the HMI interaction control section 32 of the HMI server 14. More specifically, in cases in which the acquisition section 52 has been unable to acquire an intent label, the acquisition section 52 transmits no-results information to the HMI server 14. In cases in which the acquisition section 52 has acquired a single intent label, or in cases in which the OM item code and the intent label have been received from the HMI interaction control section 32, the acquisition section 52 transmits the associated response information to the HMI server 14. In cases in which the acquisition section 52 has acquired plural intent labels, the acquisition section 52 transmits the generated option information to the HMI server 14.

The intent inference section 38, serving as an inference section, executes intent inference processing as inference processing to infer the intent of a question from an occupant. The intent inference processing is executed employing the intent inference engine associated with the intent inference engine ID. Specific explanation follows regarding execution of the intent inference processing. Firstly, the intent inference section 38 uses the word normalization data 230 to perform pre-processing on the text of the acquired text information. The pre-processing standardizes differences in notation and differences in phrasing. Next, the intent inference section 38 inputs the trained model 240 prepared for the corresponding intent inference engine with the pre-processed text information, and outputs an intent label and confidence score. The confidence score corresponds to a probability that the text information input to the trained model 240 matches the inferred intent label. The intent inference section 38 then provides any intent labels having a confidence score exceeding a predetermined value, namely intent labels vouched to have at least a predetermined probability of dependability, to the OMA interaction control section 36.

OM Server

The OM server 18 is a server 30 that provides an owner's manual. The data group 110 of the OM server 18 includes OM data 300, this being HTML data relating to owner's manuals. In a case in which an image relating to response information or option information is displayed on the monitor 28 of the vehicle 12, the occupant selects a URL included in the image to execute a transmission request for HTML data associated with the URL to the OM server 18. The HTML data of the owner's manual associated with the URL is thus transmitted to the onboard device 20 to be displayed on the monitor 28.

Control Flow

Figure 9:
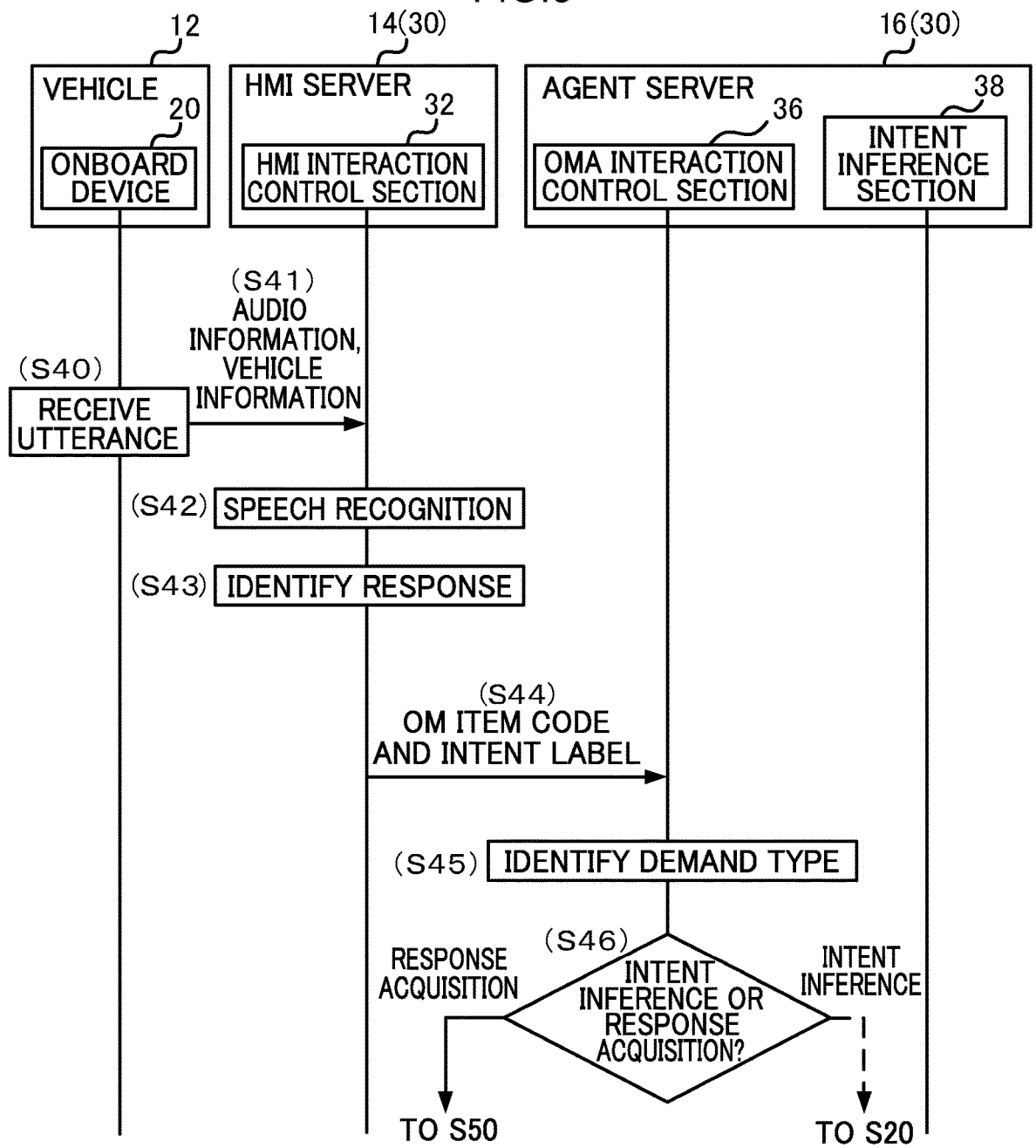
FIG. 9 is a sequence chart illustrating an example of a flow of processing in a case in which a selection result is received in a manual provision system of the first exemplary embodiment.
Figure 10:
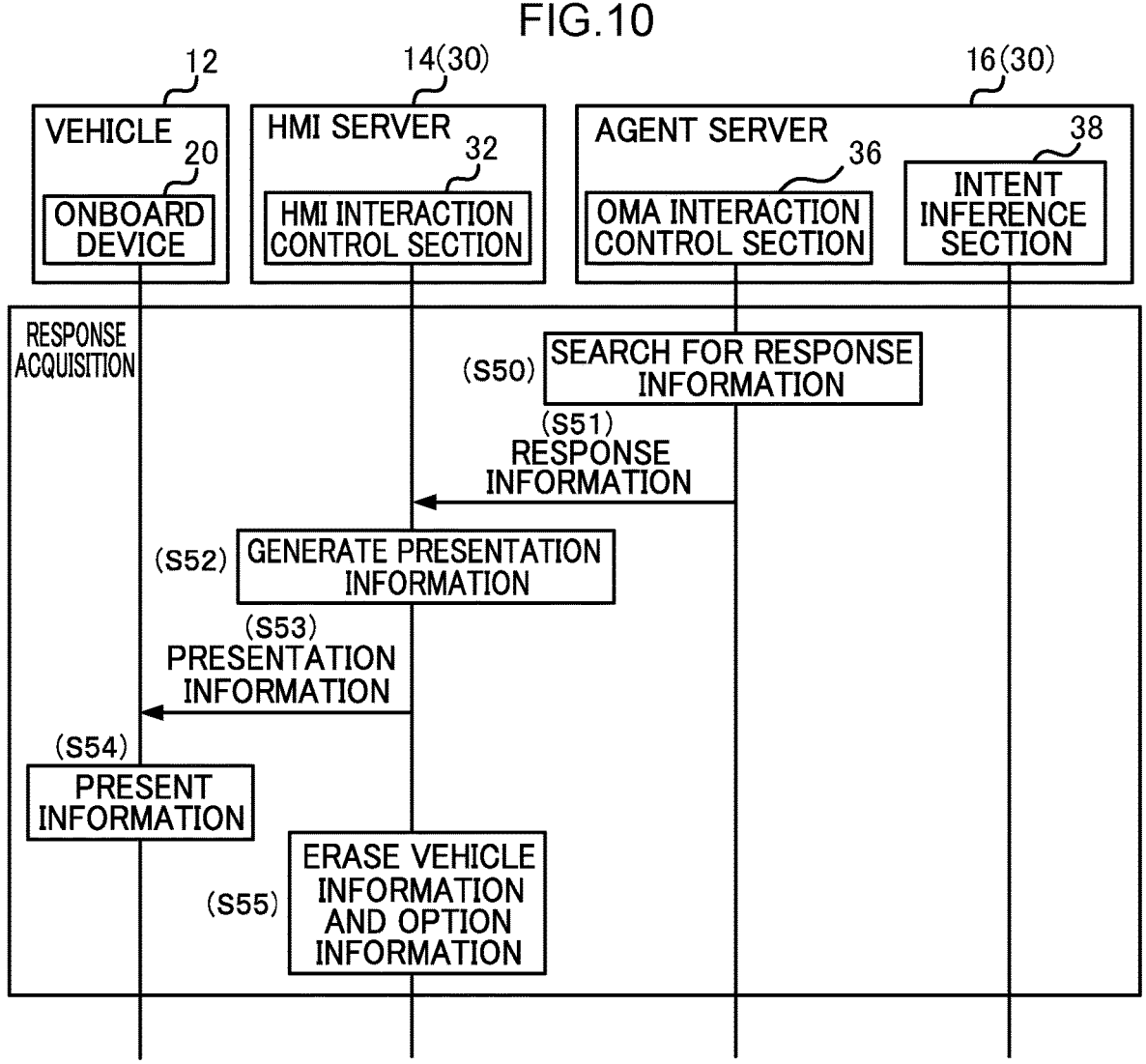
FIG. 10 is a sequence chart illustrating an example of a flow of processing in a case in which a response is acquired in a manual provision system of the first exemplary embodiment.
Figure 11:
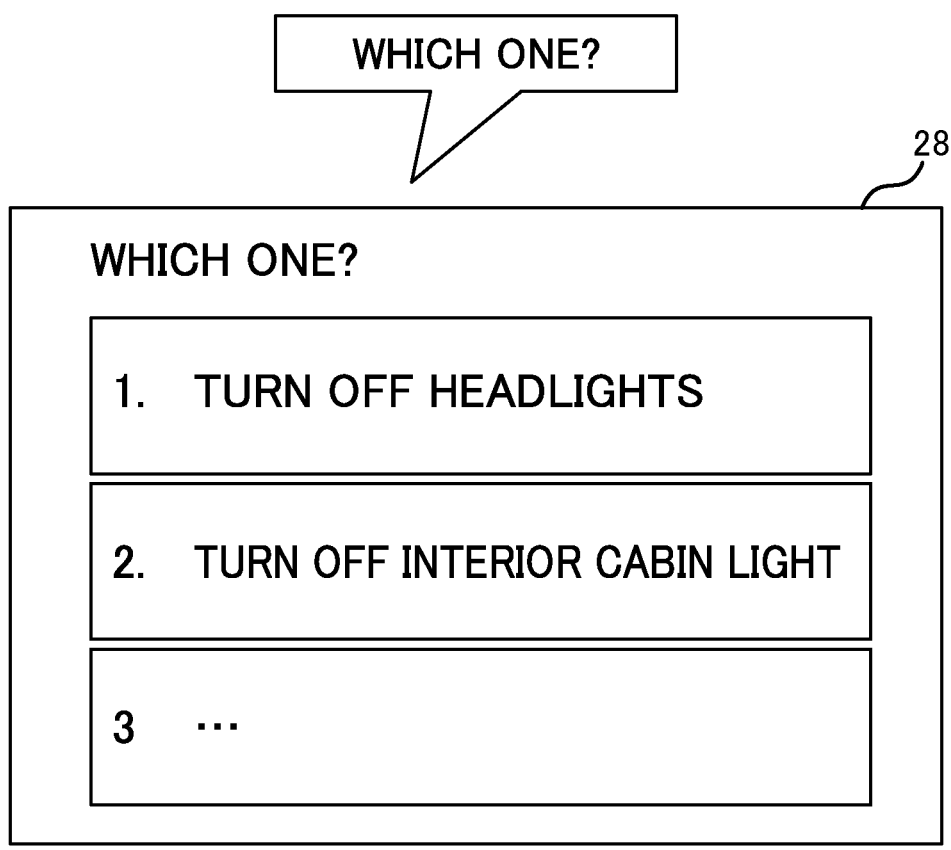
FIG. 11 is a diagram illustrating an example of options corresponding to option information presented to an occupant.
Figure 12:
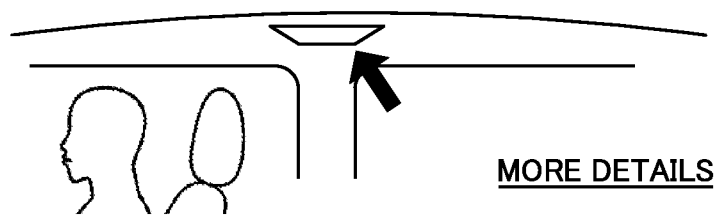
FIG. 12 is a diagram illustrating an example of a response corresponding to response information presented to an occupant.

Explanation follows regarding a flow of processing executed by the manual provision system 10 of the present exemplary embodiment, with reference to the sequence charts in FIG. 7 to FIG. 10, and to the examples of information provision in FIG. 11 and FIG. 12.

Figure 7:
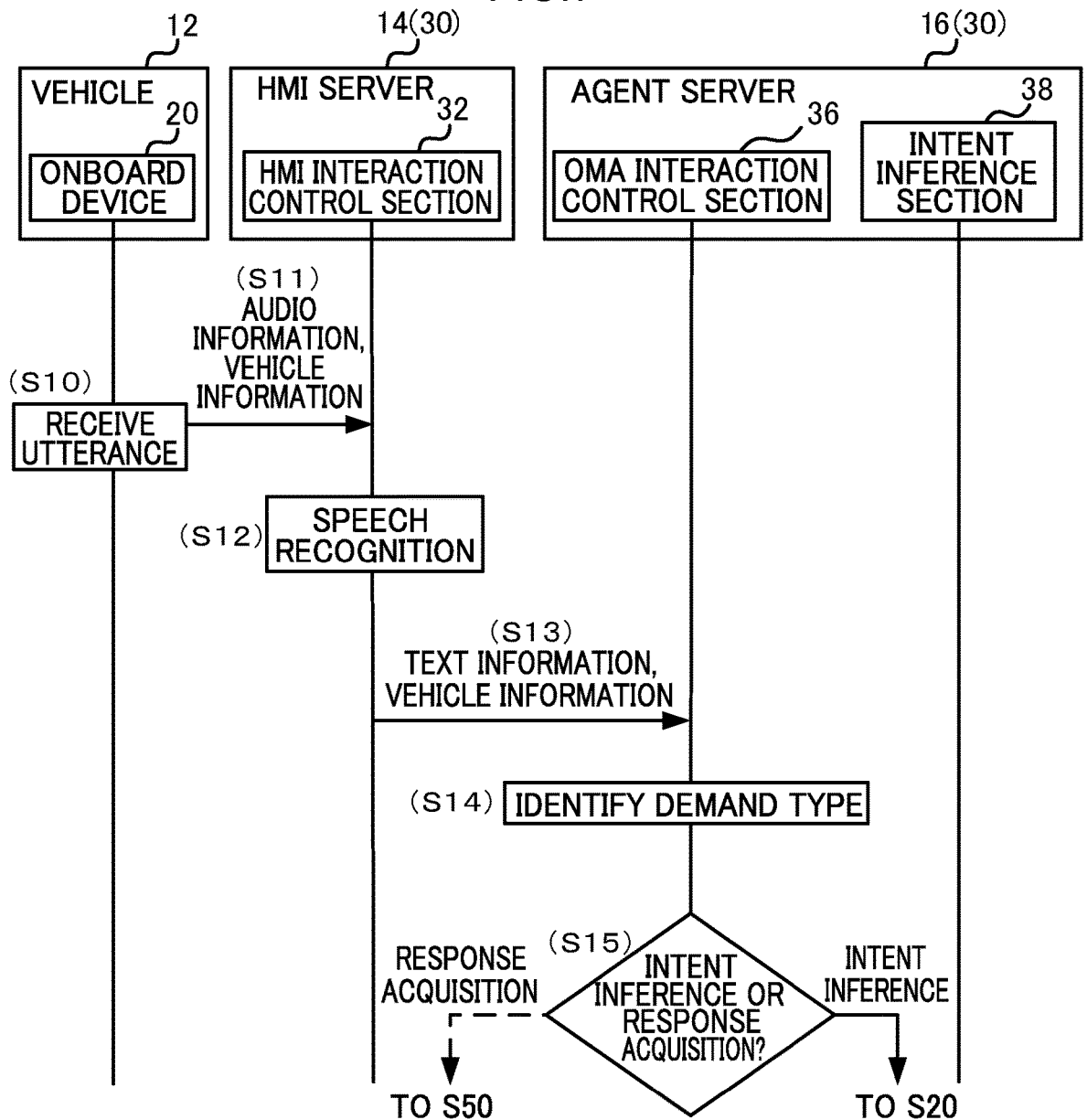
FIG. 7 is a sequence chart illustrating an example of a flow of processing in a case in which a question is received in a manual provision system of the first exemplary embodiment.

At step S10 in FIG. 7, the onboard device 20 receives an utterance from the occupant. More specifically, the CPU 20A of the onboard device 20 acquires audio uttered into the microphone 24 by the occupant as audio information. For example, suppose that the occupant says the phrase "How do I turn off this lamp?" in a state in which an interior cabin light of the vehicle 12 is illuminated. When this is performed, the utterance is received such that the phrase of "How do I turn off this lamp?" is acquired as audio information.

At step S11, the onboard device 20 transmits the acquired audio information and the vehicle information of the vehicle 12 to the HMI server 14.

At step S12, the HMI interaction control section 32 of the HMI server 14 performs speech recognition. The audio information is thus converted into text information. Note that when this speech recognition is performed, the audio information is determined to be a question in cases in which a linguistic feature corresponding to a question is included in the text information.

At step S13, the HMI interaction control section 32 transmits the text information and the vehicle information to the OMA interaction control section 36 of the agent server 16. In the above example, the text string "How do I turn off this lamp?" that has been determined to be a question is transmitted as the text information.

At step S14, the OMA interaction control section 36 identifies a demand type. In this identification, in cases in which the received information is text information the OMA interaction control section 36 identifies the demand type to be intent inference, in which intent inference processing is required, and in cases in which the received information is discrimination information including an OM item code and an intent label, the OMA interaction control section 36 identifies the demand type to be response acquisition. Note that there is no limitation to this identification method, and a flag identifying a question or a selection result may be appended to the information transmitted from the HMI interaction control section 32, with the OMA interaction control section 36 identifying the demand type by checking this flag.

Note that since the OMA interaction control section 36 received text information at step S13, the OMA interaction control section 36 identifies that the demand type is intent inference at step S14.

At step S15, the OMA interaction control section 36 determines whether the demand type is intent inference or the demand type is response acquisition. In cases in which the OMA interaction control section 36 determines that the demand type is intent inference, processing proceeds to step S20. In cases in which the OMA interaction control section 36 determines that the demand type is response acquisition, processing proceeds to step S50.

Note that since the demand type has been identified as intent inference at step S14, the OMA interaction control section 36 determines that the demand type is intent inference at step S15, and processing proceeds to step S20.

Figure 8:
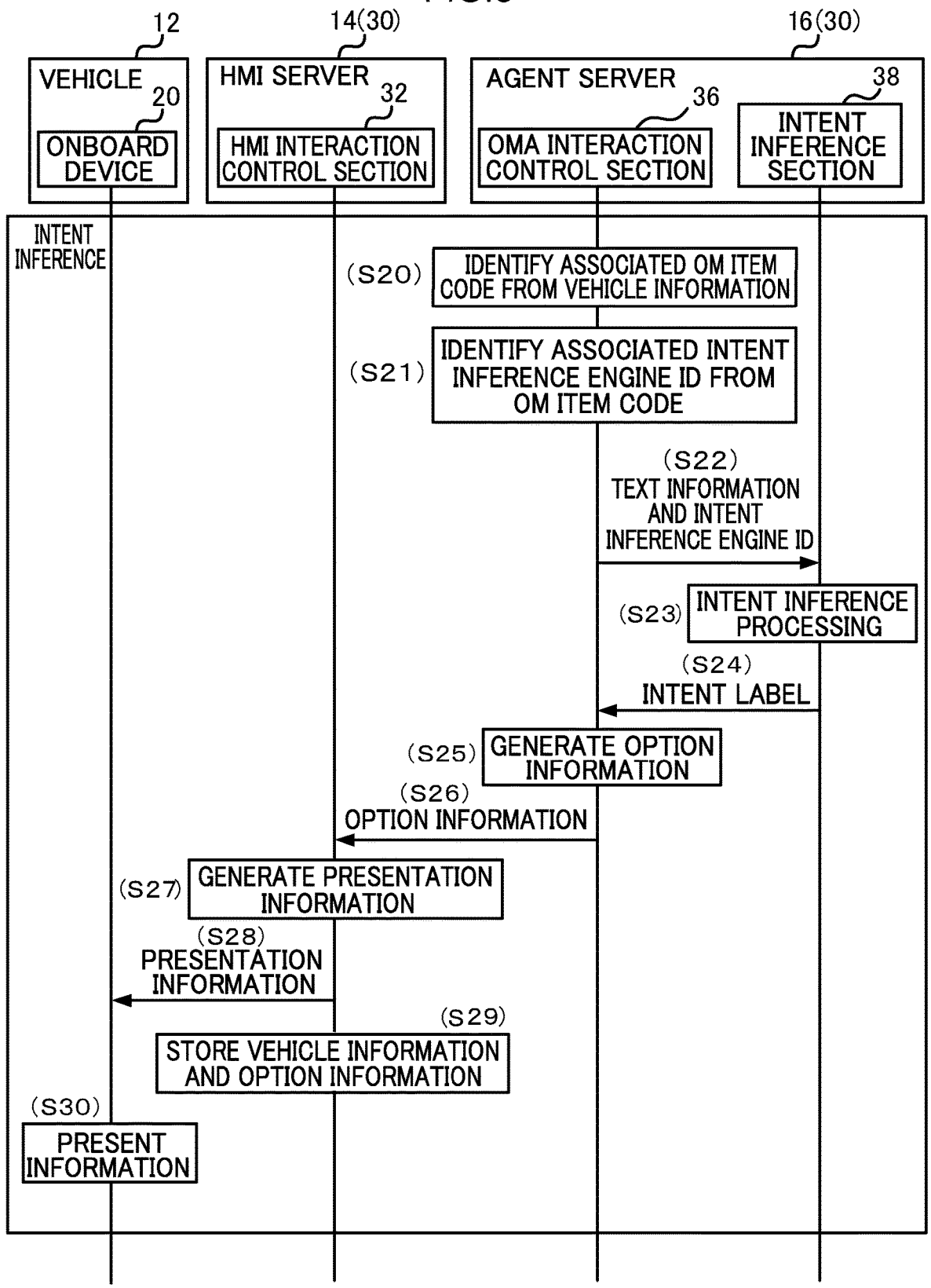
FIG. 8 is a sequence chart illustrating an example of a flow of processing in a case in which intent of a question is inferred in a manual provision system of the first exemplary embodiment.

Next, explanation follows regarding a flow of processing in a case in which the demand type is intent inference, with reference to FIG. 8.

At step S20 in FIG. 8, the OMA interaction control section 36 identifies an associated OM item code based on the vehicle information. Namely, the OMA interaction control section 36 identifies an owner's manual associated with the vehicle identification number, vehicle type, grade, equipment, or the like of the vehicle 12.

At step S21, the OMA interaction control section 36 identifies the associated intent inference engine ID based on the OM item code. Namely, the intent inference engine associated with the owner's manual of the vehicle 12 is identified.

At step S22, the OMA interaction control section 36 provides the text information acquired from the HMI server 14 and the intent inference engine ID to the intent inference section 38.

At step S23, the intent inference section 38 executes intent inference processing. The intent inference section 38 thus outputs one or plural intent labels associated with the text information. In the example of the present exemplary embodiment, at least an intent label number 289 associated with the method of extinguishing the headlights, and an intent label number 13 relating to the method of extinguishing the interior cabin light, are output based on the text information of "How do I turn off this lamp?" (see FIG. 6).

At step S24 the intent inference section 38 provides the OMA interaction control section 36 with an intent label that has a confidence score exceeding a predetermined value. Note that in cases in which no intent labels with a confidence score exceeding the predetermined value are output, the intent inference section 38 provides the OMA interaction control section 36 with no-label information to indicate that no intent labels have been returned.

At step S25, the OMA interaction control section 36 generates option information. Namely, as illustrated in FIG. 6, a list of response numbers is generated in which a combination of an intent label, text for audio, text for display, and an OM item code to be consulted are associated with each response number.

At step S26 in FIG. 8, the OMA interaction control section 36 transmits the option information to the HMI server 14.

At step S27, the HMI interaction control section 32 generates presentation information. The presentation information is information for transmission to the onboard device 20, and is option information from which information that does not need to be presented using the monitor 28 or the speaker 29, for example the intent label, the OM item code, and the like, has been cut. Note that the option information may also be employed as-is as the presentation information.

At step S28, the HMI interaction control section 32 transmits the presentation information to the onboard device 20.

At step S29, the HMI interaction control section 32 stores the vehicle information acquired at step S11 and the option information acquired at step S26 in the storage 30D of the HMI server 14.

At step S30, the onboard device 20 presents the received presentation information to the occupant of the vehicle 12. Specifically, the CPU 20A of the onboard device 20 displays an image relating to the received presentation information on the monitor 28, and outputs audio relating to the received presentation information through the speaker 29. For example, as illustrated in FIG. 11, the CPU 20A displays plural options such as "1. Turn off headlights" and "2. Turn off interior cabin light" on the monitor 28, and outputs audio asking "Which one?" through the speaker 29.

Next, explanation follows regarding a flow of processing in a case in which the occupant has selected a single response from the options, with reference to FIG. 9.

At step S40 in FIG. 9, the onboard device 20 receives an utterance from the occupant. The specifics thereof are the same as at step S10. For example, in cases in which options are displayed on the monitor 28 as illustrated in FIG. 11, the occupant may say "Number 2" into the microphone 24. In such cases, the phrase "Number 2" is acquired as audio information on receiving this utterance.

At step S41, the onboard device 20 transmits the acquired audio information to the HMI server 14 together with vehicle information of the vehicle 12.

At step S42, the HMI interaction control section 32 of the HMI server 14 performs speech recognition. The audio information is thus converted into text information. Note that when this speech recognition is performed, the audio information is determined to be a selection result in cases in which a number allocated to an option or a linguistic feature or the like associated with a display position of an option on the monitor 28 is included in the text information.

At step S43, the HMI interaction control section 32 consults the vehicle information and the option information stored in the storage 30D to identify the response corresponding to the selection result. To explain in more detail, the HMI interaction control section 32 consults the storage 30D to acquire from the storage 30D the option information relating to vehicle information matching the vehicle information acquired at step S41, and to acquire the OM item code included in this option information. The number of the response, the option position information, or the like that was converted to text at step S42 is then checked against the list of responses included in the option information in order to acquire the intent label.

At step S44, the HMI interaction control section 32 transmits the acquired OM item code and intent label combination to the OMA interaction control section 36 of the agent server 16. In the example illustrated in FIG. 6 and FIG. 11, a combination of the OM item code "OM 123-4" and the intent label "13" is transmitted as selection information in response to the text information "Number 2".

At step S45, the OMA interaction control section 36 identifies the demand type. The specifics thereof are the same as at step S14.

Note that since the OMA interaction control section 36 acquired an OM item code and intent label at step S44, the OMA interaction control section 36 identifies that the demand type is response acquisition at step S45.

At step S46, the OMA interaction control section 36 determines whether the demand type is either intent inference or the demand type is response acquisition. The specifics thereof are the same as at step S15.

Note that since the demand type has been identified as response acquisition at step S45, the OMA interaction control section 36 determines that the demand type is response acquisition at step S46, and processing proceeds to step S50.

Next, explanation follows regarding a flow of processing in a case in which the demand type is response acquisition, with reference to FIG. 10.

At step S50 in FIG. 10, the OMA interaction control section 36 searches for the response information. Namely, the OMA interaction control section 36 consults the QA data 220 associated with the OM item code to acquire the response information associated with the intent label.

At step S51, the OMA interaction control section 36 transmits the response information to the HMI server 14.

At step S52, the HMI interaction control section 32 generates presentation information. The presentation information is response information from which information that does not need to be presented using the monitor 28 or the speaker 29, for example the intent label, the OM item code, and the like, has been cut. Note that the response information may also be employed as-is as the presentation information.

At step S53, the HMI interaction control section 32 transmits the presentation information to the onboard device 20.

At step S54, the onboard device 20 presents the received presentation information to the occupant of the vehicle 12. The specifics thereof are the same as at step S30. For example, as illustrated in FIG. 12, the CPU 20A displays an image explaining how to turn off the interior cabin light on the monitor 28, and outputs audio stating "How to turn off interior cabin light" through the speaker 29. Note that the contents of the owner's manual can be displayed by selecting the text string "More details" displayed in the image on the monitor 28 (for example, by touching the text string displayed on the touch panel configuring the monitor 28).

At step S55, the HMI interaction control section 32 erases the vehicle information and option information associated with the presented response information from the information stored in the storage 30D of the HMI server 14.

Summary of First Exemplary Embodiment

In the manual provision system 10 of the present exemplary embodiment, when the occupant of the vehicle 12 asks a question that is input through the onboard device 20, a response obtained by inferring the intent of the question can be provided to the onboard device 20. In the agent server 16, in cases in which the text information configuring the input information received by the reception section 50 is a user question, the acquisition section 52 acquires a response based on the intent of the question as obtained through inference processing. Note that in cases in which the acquisition section 52 acquires plural responses, the provision section 56 transmits option information to the HMI server 14, and the HMI server 14 transmits the option information to the onboard device 20 as presentation information. The onboard device 20 receives the presentation information, enabling the occupant to check the plural response options on the monitor 28.

When the occupant then inputs the onboard device 20 with a selection result from out of the options, for example by the occupant uttering a number allocated to an option, the reception section 50 of the agent server 16 receives selection information relating to this selection result as new input information. When the determination section 54 of the agent server 16 determines that this new input information is selection information, the provision section 56 transmits response information for a single response associated with the selection result to the HMI server 14, and the HMI server 14 transmits the response information to the onboard device 20 as presentation information. In such cases, the agent server 16 does not execute intent inference processing on the selection information.

Note that were intent inference processing to be executed on selection information such as a number or a symbol, for example were intent inference processing to be executed for an input value of the text information "Number 2" as a result of the occupant uttering "Number 2", it would not be possible to infer a question intent therefrom, and therefore it would not be possible to acquire an intent label. Regarding this point, in the present exemplary embodiment, the HMI server 14 is able to directly acquire the response from the agent server 16 based on the option response number, namely "Number 2". Namely, in cases in which plural responses are presented as options in response to the question posed by the occupant, the present exemplary embodiment enables a response to be presented to the occupant directly based on the selection result of the occupant, without going through the intent inference processing. Situations in which the intent of the occupant cannot be inferred when a selection result has been conveyed are thereby suppressed.

In the agent server 16 of the present exemplary embodiment, the intent inference section 38 uses the trained model 240 generated by performing machine learning in advance to infer the intent. Thus, the present exemplary embodiment enables the precision with which the intent of the question from the occupant is inferred to be improved by learning a greater number of expressions.

In the HMI server 14 of the present exemplary embodiment, when presentation information configured by option information is transmitted to the onboard device 20, the HMI interaction control section 32 stores the option information and the vehicle information. In cases in which the HMI interaction control section 32 receives audio information from the onboard device 20 accompanying option selection by the occupant, the HMI interaction control section 32 requests a response by transmitting the identification information configured by a combination of the OM item code and the intent label to the agent server 16. Thus, in the HMI server 14 of the present exemplary embodiment, when the occupant has selected a response from the presented options, the HMI interaction control section 32 can use the identification information to search the agent server 16 directly for a response. This enables the processing load on the agent server 16 when generating the response information to be reduced. Moreover, when performing response acquisition, the response can be searched for using a number, symbol, reference numeral, or the like instead of text information, thereby enabling the volume of communication between the HMI server 14 and the agent server 16 to be suppressed.

The manual provision system 10 according to the present exemplary embodiment is applied to the vehicle 12, and is thus capable of enhancing convenience of operation for an occupant, in particular the driver, of the vehicle 12.

Second Exemplary Embodiment

In the first exemplary embodiment, the HMI server 14 and the agent server 16 are configured by different servers 30. However, in a second exemplary embodiment the HMI server 14 is consolidated with the agent server 16, as illustrated in FIG. 13.

With the exception of the advantageous effect of suppressing the volume of communication, the manual provision system 10 of the present exemplary embodiment is capable of obtaining similar advantageous effects to those of the first exemplary embodiment.

REMARKS

In the exemplary embodiments described above, audio information based on an utterance of an occupant configures the input information of the HMI server 14. However, there is no limitation thereto, and the input information may be configured by operation information based on operation of the touch panel configuring the monitor 28 by the occupant. In such cases, the operation information is, for example, text information relating to a text string input to the monitor 28 by the occupant.

In the second exemplary embodiment described above, the HMI server 14 included in the manual provision system 10 is consolidated with the agent server 16. However, the OM server 18 may also be consolidated. The servers 30 configuring some out of the HMI server 14, the agent server 16, and the OM server 18 may be consolidated. Moreover, in the agent server 16, the functionality of the OMA interaction control section 36 and the intent inference section 38 may be distributed between different servers 30.

The various processing executed by the CPUs 20A, 30A reading software (a program) in the exemplary embodiments described above may be executed by various types of processor other than the CPUs. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

The exemplary embodiments described above described implementations in which the program is in a format pre-stored (installed) in a computer-readable non-transitory recording medium. For example, the processing program 100 of each of the servers 30 is pre-stored in the corresponding storage 30D. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the program may be provided in a format downloadable from an external device through a network.

Instead of being executed by a single processor, the processing of the exemplary embodiments described above may be executed by plural processors working in collaboration. The processing flows explained in the above exemplary embodiment are merely examples, and superfluous steps may be omitted, new steps may be added, or the processing sequences may be changed within a range not departing from the spirit of the present disclosure.

An object of the present disclosure is to provide an agent device, an agent system, and a non-transitory recording medium capable of suppressing situations in which the intent of a user cannot be inferred by an agent configured to infer the intent of questions in cases in which plural responses are presented as response options to a user question.

A first aspect of the disclosure is an agent device that includes: a memory; and a processor coupled to the memory. The processor is configured to: receive, from a notification device for notifying information to a user, input information that is input by the user, in a case in which the input information is a question from the user, execute inference processing on the input information to infer an intent of the question in order to acquire a response to the question based on the intent, in a case in which a plurality of the responses are acquired, provide the notification device with option information that includes the plurality of responses as options, in a case in which new input information is received, determine whether the new input information is information requiring the inference processing or is selection information relating to a selection result from selection of the options, and in a case in which the new input information is the selection information, provide the notification device with response information regarding the response associated with the selection result without executing the inference processing.

The agent device of the first aspect is capable of providing the notification device with a response obtained by inferring the intent of the question when the user has input a question through the notification device. In this agent device, in a case in which the received input information is a question from the user, the agent device acquires a response based on the intent of the question as obtained by the inference processing. Note that in a case in which the agent device has acquired plural responses, the notification device acquires the option information, enabling the user to check the plural response options. When the user then inputs the notification device with a selection result from out of the options, the agent device receives the selection information relating to the selection result as new input information. In a case in which the agent device determines that the new input information is selection information, response information corresponding to a single response associated with this selection result is provided to the notification device, without subjecting the selection information to the inference processing. In a case in which plural responses to a user question have been presented as options, the agent device presents the user with the response corresponding to the selection result from the user directly, without going through the inference processing. Situations in which the intent of the user cannot be inferred when a selection result has been conveyed are thereby suppressed.

A second aspect of the disclosure is the agent device of the first aspect, wherein the processor is configured to perform the inference processing by inputting the received input information into a trained model generated employing information regarding a plurality of expressions relevant to a hypothetical question and information regarding correct responses to the plurality of expressions.

In the agent device of the second aspect, the intent is inferred using the trained model generated by performing machine learning in advance. This agent device thus enables the precision with which the intent of the question from the user is inferred to be improved by learning a greater number of expressions.

A third aspect of the disclosure is the agent device of the first aspect, wherein in a case in which the input information acquired from the notification device is information requiring the inference processing, the processor is configured to convert the input information to text and provide the input information that has been converted to text, and in a case in which the input information acquired from the notification device is information corresponding to the selection result, the processor is configured to provide the selection information.

In the agent device of the third aspect, in cases in which input information relating to a selection result from out of the options has been acquired from the notification device, this input information is provided as selection information instead of as text information. In a case in which the user has selected a response from the presented options, the agent device is able to search for this response using a number, symbol, reference numeral, or the like. This enables the processing load required when generating the response information to be reduced.

A fourth aspect of the disclosure is the agent device of the third aspect, wherein in a case in which the option information is provided, the processor is configured to store specific information configured to specify the notification device and to store the option information, at the memory; in a case in which the specific information and input information associated with the selection result have been acquired from the notification device, the processor is configured to specify a response associated with the selection result based on the specific information and the option information, and to provide identification information identifying the response associated with the selection result, as the selection information; and the processor is configured to provide the notification device with response information relating to a response that corresponds to the identification information.

In the agent device of the fourth aspect, the options with which the user is notified and information regarding the notification destination are stored, and in a case in which input information has been received accompanying selection of an option by the user, the identification information is provided and the response is requested. In this agent device, in a case in which the user has selected a response from the presented options, the identification information can be utilized when searching for the response, enabling the processing load required when generating the response information to be reduced.

A fifth aspect of the disclosure is the agent device of the first aspect, wherein as the option information, the processor is configured to provide the notification device with numbers identifying a plurality of the responses together with the responses.

A sixth aspect of the disclosure is an agent system that includes an agent device and a notification device installed in a vehicle. The agent device includes a memory and a processor coupled to the memory. The processor is configured to receive, from a notification device for notifying information to a user, input information that is input by the user; in a case in which the input information is a question from the user, execute inference processing on the input information to infer an intent of the question in order to acquire a response to the question based on intent; in a case in which a plurality of the responses are acquired, provide the notification device with option information that includes the plurality of responses as options; in a case in which new input information is received, determine whether the new input information is information requiring the inference processing or is selection information relating to a selection result from selection of the options; and in a case in which the new input information is the selection information, provide the notification device with response information regarding the response associated with the selection result without executing the inference processing.

In the agent system of the sixth aspect, the notification device is installed in the vehicle, and the occupant, namely the user, can be provided with a response to a question. This agent system is capable of enhancing convenience of operation for the user in the vehicle.

An seventh aspect of the disclosure is the agent system of the sixth aspect further includes an interface device. The interface device includes a memory; and a processor coupled to the memory, wherein in a case in which the input information acquired from the notification device is information requiring the inference processing, the processor of the interface device is configured to convert the input information to text and provide the input information that has been converted to text, and in a case in which the input information acquired from the notification device is information corresponding to the selection result, the processor of the interface device is configured to provide the selection information.

The agent system of the seventh aspect is capable of providing a response to a question from the occupant of the vehicle, namely the user. In this agent system, the notification device is installed in the vehicle, and the interface device is provided between the notification device and the agent device. In this agent system, in cases in which the interface device has acquired input information from the notification device that relates to a selection result from out of the options, the input information is provided to the agent device as selection information instead of as text information. In this agent system, in cases in which the user has selected a response from the presented options, this response can be searched using a number, symbol, reference numeral, or the like. This enables the processing load on the agent device when generating the response information to be reduced. This also enables convenience of operation to be enhanced for the user in the vehicle.

An eighth aspect of the disclosure is a non-transitory recording medium storing a program that is executable by a computer to perform processing. The processing includes: receiving, from a notification device for notifying information to a user, input information that is input by the user; in a case in which the input information is a question from the user, executing inference processing on the input information to infer an intent of the question in order to acquire a response to the question based on the intent; in a case in which a plurality of the responses are acquired, providing the notification device with option information that includes the plurality of responses as options; in a case in which new input information has been received, determining whether the new input information is information requiring the inference processing or is selection information relating to a selection result from selection of the options; and in a case in which the new input information is the selection information, providing the notification device with response information regarding the response associated with the selection result without executing the inference processing.

The non-transitory recording medium stored with a program of the eighth aspect is capable of causing a computer to execute processing to provide the notification device with a response obtained by inferring the intent of the question when the user has input a question using the notification device. In the computer that executes the program, in cases in which the received input information is a question from the user, a response is acquired based on the intent of the question, as obtained by the inference processing. Note that in cases in which the computer has acquired plural responses, the notification device acquires the option information, enabling the user to check the plural response options. When the user then inputs the notification device with a selection result from out of the options, the computer receives the selection information relating to the selection result as new input information. In cases in which the computer that executes the program determines that the new input information is selection information, response information corresponding to a single response associated with this selection result is provided to the notification device, without subjecting the selection information to the inference processing. In cases in which plural responses to a user question have been presented as options, the program presents the user with the response corresponding to the selection result from the user directly, without going through the inference processing. Situations in which the intent of the user cannot be inferred when a selection result has been conveyed are thereby suppressed.

The present disclosure is capable of suppressing situations in which the intent of a user cannot be inferred by an agent configured to infer the intent of questions in cases in which plural responses are presented as options in response to a user question.

What is claimed is:
1. An agent device comprising:
a memory; and
a processor coupled to the memory, the processor being configured to:

receive, from a notification device for notifying information to a user, input information that is input by the user, in a case in which the input information is a question from the user, execute inference processing on the input information to infer an intent of the question in order to acquire a response to the question based on the intent, in a case in which a plurality of the responses are acquired, provide the notification device with option information that includes the plurality of responses as options, in a case in which new input information is received, determine whether the new input information is information requiring the inference processing or is selection information relating to a selection result from selection of the options, and in a case in which the new input information is the selection information, provide the notification device with response information regarding, among the acquired plurality of responses, the response associated with the selection result without executing the inference processing.

2. The agent device of claim 1, wherein:
the processor is configured to perform the inference processing by inputting the received input information into a trained model generated employing information regarding a plurality of expressions relevant to a hypothetical question and information regarding correct responses to the plurality of expressions.

3. The agent device of claim 1, wherein:
in a case in which the input information acquired from the notification device is information requiring the inference processing, the processor is configured to convert the input information to text and provide the input information that has been converted to text, and in a case in which the input information acquired from the notification device is information corresponding to the selection result, the processor is configured to provide the selection information.

4. The agent device of claim 3, wherein:
in a case in which the option information is provided, the processor is configured to store specific information configured to specify the notification device and to store the option information, at the memory;

in a case in which the specific information and input information associated with the selection result have been acquired from the notification device, the processor is configured to specify a response associated with the selection result based on the specific information and the option information, and to provide identification information identifying the response associated with the selection result, as the selection information; and the processor is configured to provide the notification device with response information relating to a response that corresponds to the identification information.

5. The agent device of claim 1, wherein as the option information, the processor is configured to provide the notification device with numbers identifying a plurality of the responses together with the responses.

6. An agent system comprising an agent device, and a notification device installed in a vehicle, the agent device including
a memory, and
a processor coupled to the memory, the processor being configured to receive, from a notification device for notifying information to a user, input information that is input by the user;

in a case in which the input information is a question from the user, execute inference processing on the input information to infer an intent of the question in order to acquire a response to the question based on intent;

in a case in which a plurality of the responses are acquired, provide the notification device with option information that includes the plurality of responses as options;

in a case in which new input information is received, determine whether the new input information is information requiring the inference processing or is selection information relating to a selection result from selection of the options; and in a case in which the new input information is the selection information, provide the notification device with response information regarding, among the acquired plurality of responses, the response associated with the selection result without executing the inference processing.

7. The agent system of claim 6, further comprising an interface device including:
a memory; and
a processor coupled to the memory, wherein in a case in which the input information acquired from the notification device is information requiring the inference processing, the processor of the interface device is configured to convert the input information to text and provide the input information that has been converted to text, and in a case in which the input information acquired from the notification device is information corresponding to the selection result, the processor of the interface device is configured to provide the selection information.

8. A non-transitory recording medium storing a program that is executable by a computer to perform processing, the processing comprising:

receiving, from a notification device for notifying information to a user, input information that is input by the user;

in a case in which the input information is a question from the user, executing inference processing on the input information to infer an intent of the question in order to acquire a response to the question based on the intent;

in a case in which a plurality of the responses are acquired, providing the notification device with option information that includes the plurality of responses as options;

in a case in which new input information has been received, determining whether the new input information is information requiring the inference processing or is selection information relating to a selection result from selection of the options; and in a case in which the new input information is the selection information, providing the notification device with response information regarding, among the acquired plurality of responses, the response associated with the selection result without executing the inference processing.

9. The agent device of claim 1, wherein the processor is configured to determine that the new input information is the selection information, in a case in which the new input information includes a number or a linguistic feature allocated to the options.

10. The agent system of claim 6, wherein the processor is configured to determine that the new input information is the selection information, in a case in which the new input information includes a number or a linguistic feature allocated to the options.

11. The non-transitory recording medium of claim 8, wherein determining whether the new input information is selection information is based on whether the new input information includes a number or a linguistic feature allocated to the options.

* * * * *